June 27, 1939.     R. K. LE BLOND     2,164,212
ATTACHMENT FOR CUTTER GRINDERS
Filed April 21, 1938     3 Sheets-Sheet 3
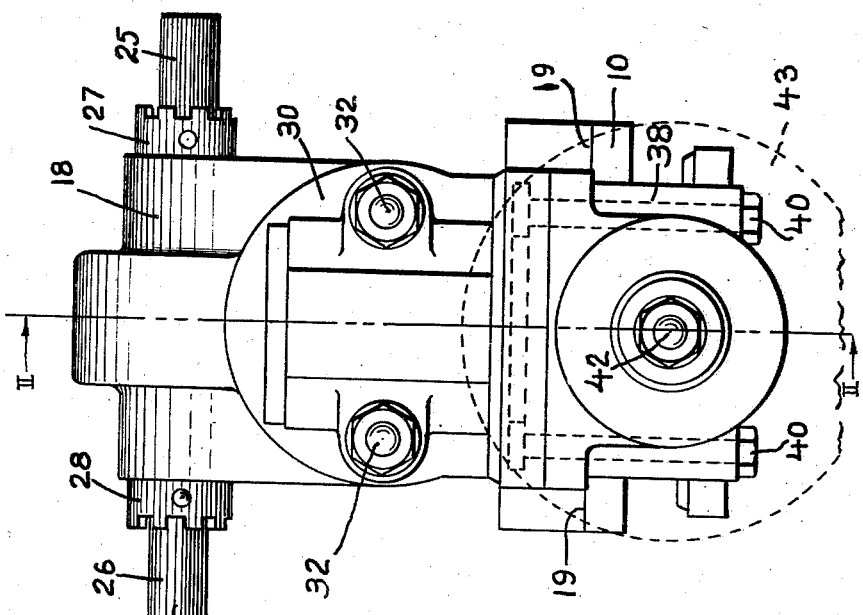
Fig. IV.
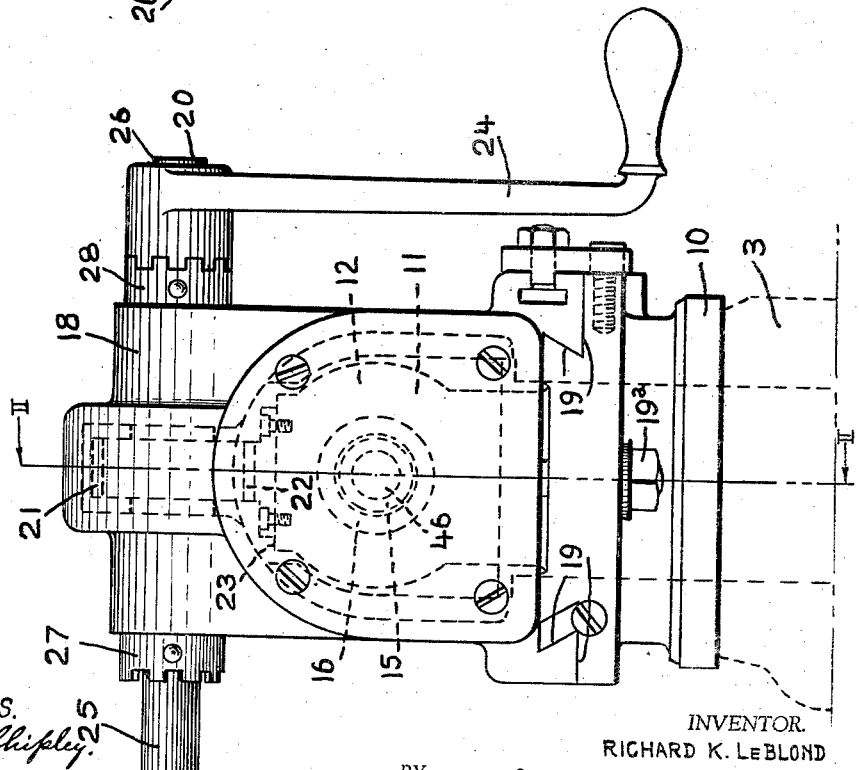
Fig. III.
WITNESS.
Elmer R. Shipley.
INVENTOR.
RICHARD K. LeBLOND
BY Willard S. Groene
ATTORNEY.

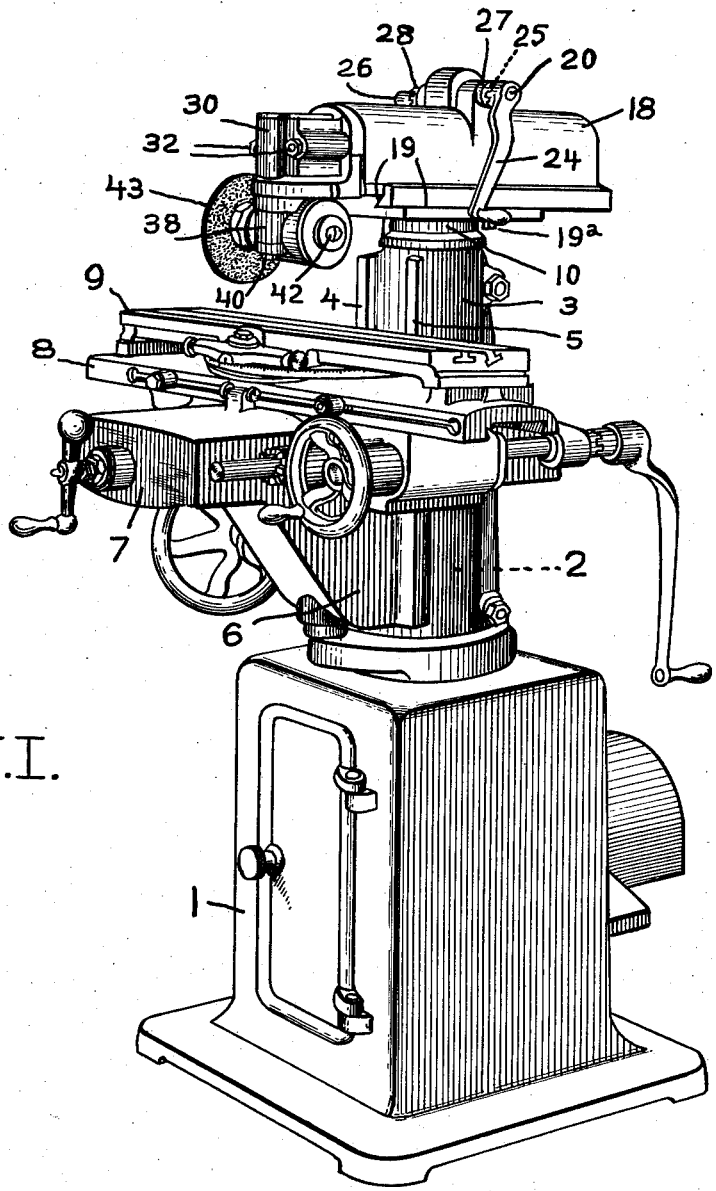
Fig. I.

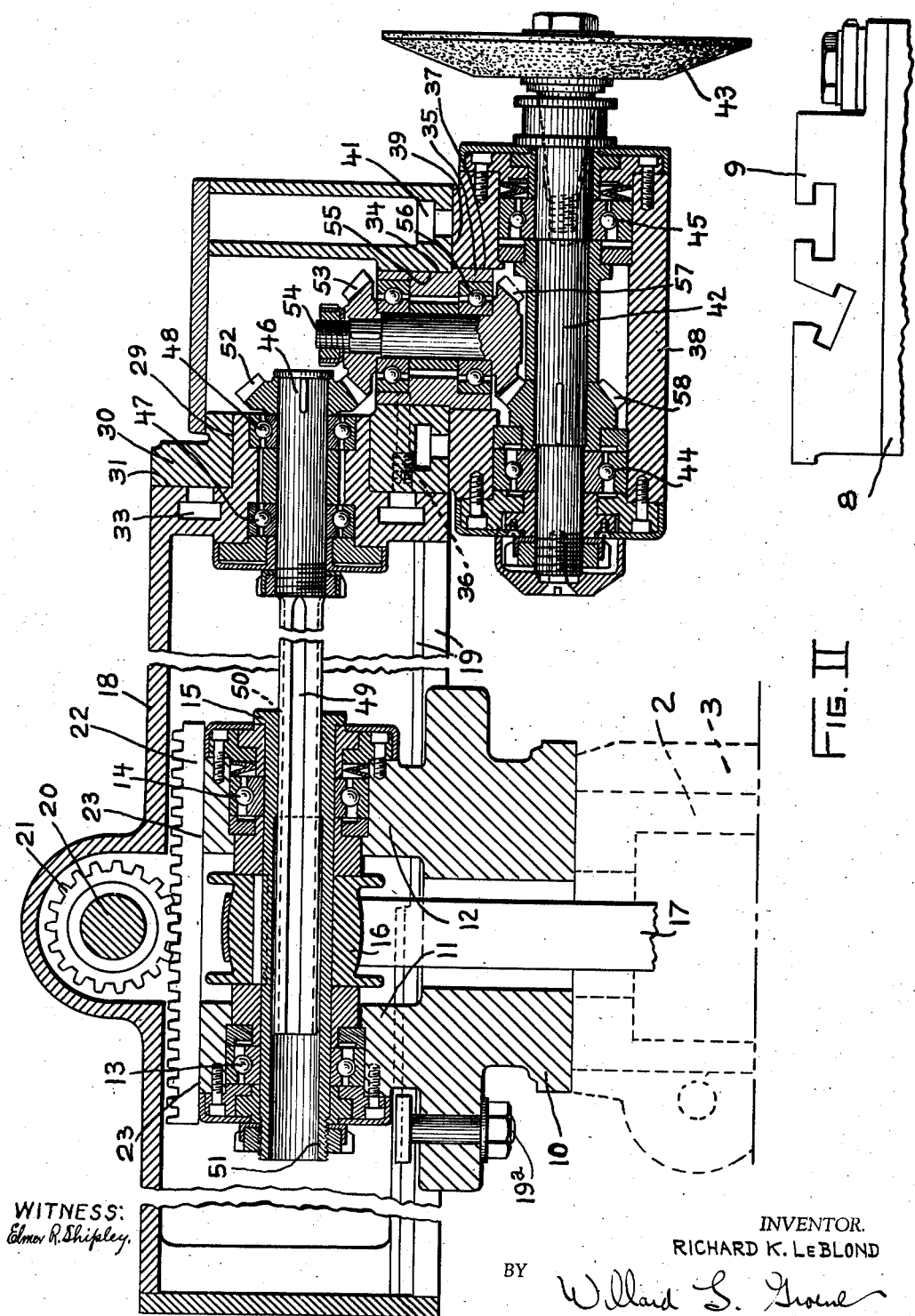

Patented June 27, 1939

2,164,212

UNITED STATES PATENT OFFICE 2,164,212

ATTACHMENT FOR CUTTER GRINDERS

Richard K. Le Blond, Cincinnati, Ohio, assignor to The R. K. Le Blond Machine Tool Company, Cincinnati, Ohio, a corporation of Delaware Application April 21, 1938, Serial No. 203,368

6 Claims. (Cl. 51—56)

This invention pertains to an attachment for cutter grinders of a character shown in Patent 932,791 dated August 31, 1909, and in copending application Serial Number 173,438 filed November 8, 1937. More particularly this invention pertains to an arrangement for universally mounting the grinding wheel spindle on the supporting stump of the cutter grinder.

One object of the invention is to mount the grinding wheel spindle so that its axis may be positioned in any plane relative to the work table of the machine.

Another object is to mount the grinding wheel spindle on the stump of the cutter grinder so that it may be reciprocated horizontally relative to the work table of the machine.

And a still further object is to provide manual means which may be operated from each side of the machine for reciprocating the grinding wheel.

Further objects and advantages of this invention will appear from the following description of the drawings in which:

Figure I is a perspective view or a cutter grinder showing the attachment applied thereto.

Figure II is a vertical section through the attachment on the line II—II of Figures III and IV.

Figure III is a rear elevation of the attachment.

Figure IV is a front elevation of the attachment.

Noting particularly Figure I, the machine comprises a base 1 upon which is fixed the stump 2 in a manner shown in the patent and application set forth above. Surrounding and swiveling on the stump 2 is the column 3. Vertically slidable on the column 3 on dovetail guideways 4 and 5 is the knee 6 on top of which is horizontally slidable the saddle 7 in a direction radially of the axis of swiveling of the column 3. On the saddle is mounted the sliding table 8 which is reciprocatable in a direction perpendicular to the direction of movement of the saddle 7 on the knee 6. A swivel table 9 is mounted on top of the sliding table 8 upon which may be placed the various work holding fixtures.

The novel grinding attachment comprises a support 10 which is fixed on the top of the stump 2 and has upwardly projecting portions 11 and 12 carrying ball bearings 13 and 14, respectively. Mounted in the bearings 13 and 14 against axial movement is the driving spindle 15 upon which is fixed the pulley 16 between said bearings which is driven by a belt 17 connected to a source of power, such as an electric motor, mounted in the base 1 of the machine.

Also carried on the base 10 is the reciprocatable housing 18 slidably mounted on the horizontal dove-tail guideways 19 for movement radially of the axis of swiveling of the column 3. Suitable T-slot bolts 19a are provided for tightly binding the housing 18 to the support 10 when no movement of the housing 18 is desired. In order to provide means for reciprocating the housing 18, an actuating rock shaft 20 is rotatably mounted in its upper part thereof and has fixed on it a pinion 21 which engages a rack 22 fixed to the upper surfaces 23 of the portions 11 and 12 of the support 10 so that by rotating the rock shaft 20, the pinion 21 will roll along the rack 22 thus moving the housing 18 on the guideways 19. In order to facilitate the rotating of the rock shaft 20, a clutch crank handle 24 is provided which may be placed on either of the projecting ends 25 or 26 of the shaft 20 and engaged with the respective clutches 27 and 28 fixed to the rock shaft 20.

On one end of the housing 18 is provided a projecting bearing 29 upon which is journaled the swiveling bracket 30, the bracket being clamped in selected positions against the face 31 of the housing 18 by suitable bolts 32 operating in an appropriate circular T-slot 33 formed in the end of the housing.

In a bore 34 formed in the bracket 30 at right angles to the axis of the bearing 29 is fitted a bushing 35 which is held in place therein by a suitable pin 36 in the bracket. The bushing 35 projects outwardly and has a bearing surface 37 upon which is mounted the swiveling wheel head 38 which may be clamped in selected positions against the face 39 of the bracket 30 by suitable bolts 40 operating in an appropriate circular T-slot 41 in the bracket.

The grinding wheel spindle 42, having a suitable grinding wheel 43 mounted thereon, is journaled in the ball bearings 44 and 45 against axial movement in the wheel head 38. The wheel spindle 42 is driven from the driving spindle 15 by the shaft 46 which is journaled against axial movement in the ball bearings 47 and 48 carried in housing 18. This shaft 46 has a splined piston 49 which is free to slide in the splined portion 50 in the bore 51 in the spindle 15 so that the shaft 46 may at all times be rotated even while the housing 18 is being reciprocated. On the other end of the shaft 46 is fixed a bevel gear 52 which drives the bevel gear 53 fixed on the intermediate shaft 54 journaled on the ball bearings 55 and 56 carried in the bushing 35. A second bevel gear 57 formed integral with the intermediate shaft 54 drives the bevel gear 58 on the wheel spindle 42. The axis of the shaft 46 coincides with the axis of swiveling of the bracket 30 and the axis of the intermediate shaft 54 coincides with the axis of swiveling of the wheel head 38 so that the wheel spindle 42 may be at all times driven in any selected position in which it might be set. It will thus be seen that the axis of the grinding wheel spindle 42 may be positioned in any plane relative to the work table 9 of the machine.

Having fully set forth and described my invention, what I claim and desire to secure by United States Letters Patent is:

1. A grinding wheel mounting for cutter grinder comprising a base fixed on the stump of said grinder, a driving spindle journaled in said base, means for driving said spindle, a housing reciprocatably mounted on said base, a grinding wheel spindle mounted on said housing, a grinding wheel on said spindle, a splined shaft slidably engaging in a mating splined bore in said driving spindle and journaled in said housing, and means interconnecting said shaft with said grinding wheel spindle whereby said grinding wheel may be rotated and reciprocated simultaneously.

2. A grinding wheel mounting for cutter grinder comprising a base fixed on the stump of said grinder, a driving spindle journaled in said base, means for driving said spindle, a housing reciprocatably mounted on said base, a grinding wheel spindle universally mounted on said housing, a grinding wheel on said spindle, a splined shaft slidably engaging in a mating splined bore in said driving spindle and journaled in said housing, and bevel gear transmission mechanism interconnecting said shaft with said grinding wheel spindle.

3. A grinding wheel mounting for cutter grinder comprising a base fixed on the stump of said grinder, means for driving said spindle, a housing reciprocatably mounted on said base, a grinding wheel spindle mounted on said housing, a grinding wheel on said spindle, a splined shaft slidably engaging in a mating splined bore in said driving spindle and journaled in said housing, means interconnecting said shaft with said grinding wheel spindle, and manual means for reciprocating said housing during rotation of said grinding wheel.

4. A grinding wheel mounting for cutter grinder comprising a base fixed on the stump of said grinder, means for driving said spindle, a housing reciprocatably mounted on said base, a grinding wheel spindle mounted on said housing, a grinding wheel on said spindle, a splined shaft slidably engaging in a mating splined bore in said driving spindle and journaled in said housing, means interconnecting said shaft with said grinding wheel spindle, means for reciprocating said housing comprising a rack fixed on said base, a rock shaft journaled in said housing, a pinion on said rock shaft engaging said rack, and lever operating means for actuating said rock shaft.

5. A grinding wheel mounting for cutter grinder comprising a base fixed on the stump of said grinder, means for driving said spindle, a housing reciprocatably mounted on said base, a swiveling bracket mounted on said housings for swiveling in a vertical plane, a swiveling wheel head mounted on said bracket for swiveling in a plane perpendicular to said first mentioned plane, a grinding wheel spindle mounted in said wheel head, a grinding wheel on said spindle, a splined shaft journaled in said housing and slidably engaging in a mating splined bore in said driving spindle, means interconnecting said shaft with said grinding wheel spindle, means for reciprocating said housing, and means for driving said driving spindle for rotating said grinding wheel.

6. A grinding wheel mounting for cutter grinder comprising a base fixed on the stump of said grinder, means for driving said spindle, a housing reciprocatably mounted on said base, a grinding wheel spindle mounted on said housing, a grinding wheel on said spindle, a splined shaft slidably engaging in a mating splined bore in said driving spindle and journaled in said housing, means interconnecting said shaft with said grinding wheel spindle, means for reciprocating said housing comprising a rack fixed on said base, a rock shaft journaled in said housing, a pinion on said rock shaft engaging said rack, said rock shaft projecting outwardly each side of said housing, and lever operating means adapted to be placed on either of said projections of said rock shaft for reciprocating said housing from either side of the cutter grinder.

RICHARD K. LE BLOND.